Feb. 20, 1934.  H. F. FISHER  1,947,704
METHOD OF AND APPARATUS FOR RESOLVING LOOSE EMULSIONS
Original Filed July 3, 1929
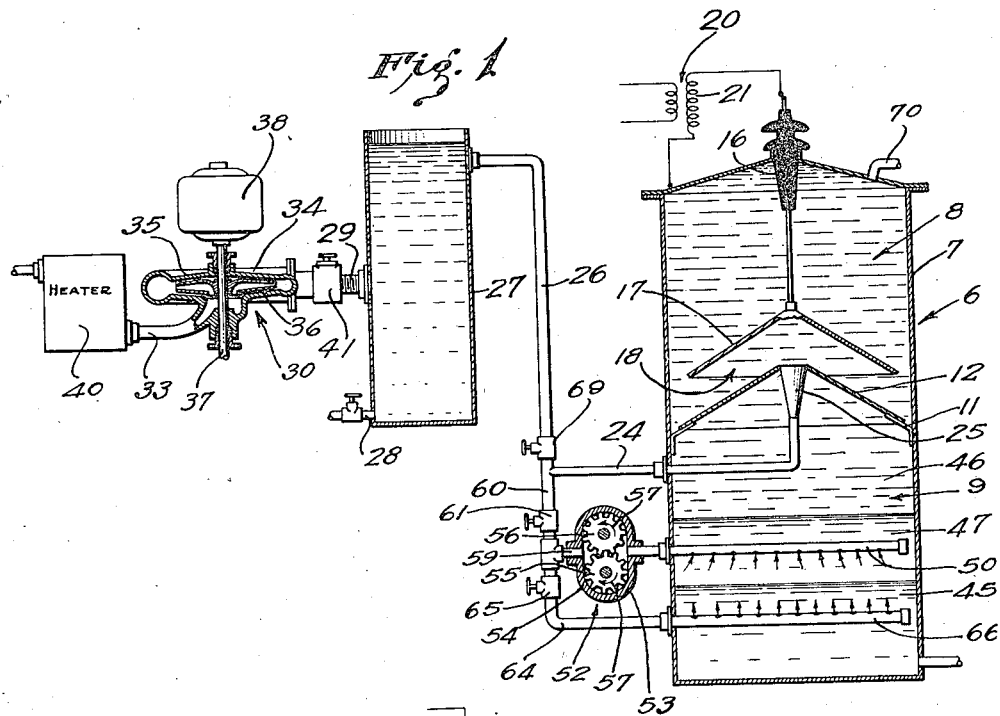
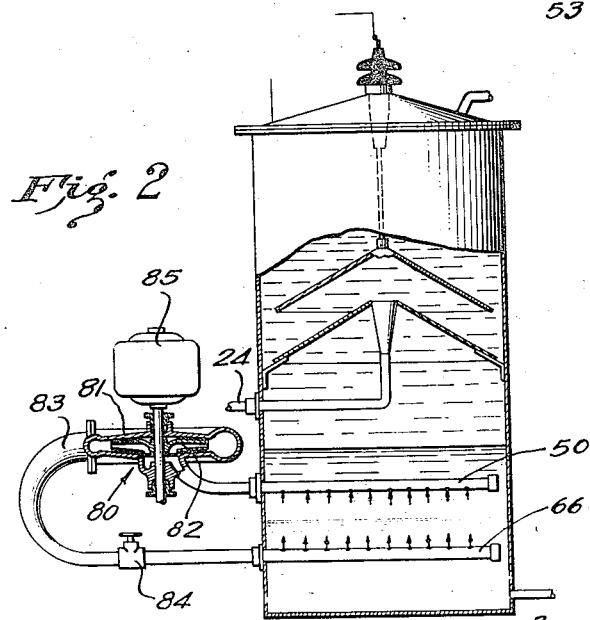
INVENTOR
Harmon F. Fisher
By
ATTORNEY.

Patented Feb. 20, 1934

1,947,704

UNITED STATES PATENT OFFICE 1,947,704

METHOD OF AND APPARATUS FOR RESOLVING LOOSE EMULSIONS

Harmon F. Fisher, Long Beach, Calif., assignor to Petroleum Rectifying Company of California, Los Angles, Calif., a corporation of California Original application July 3, 1929, Serial No. 375,819. Divided and this application May 24, 1930. Serial No. 455,242

7 Claims. (Cl. 196—3)

The present invention relates to a novel method and apparatus for separating and resolving the phases of an emulsion, and is a division of an application entitled "Method of and apparatus for resolving oil-water suspensions and loose emulsions", filed July 3, 1929, Serial No. 375,819.

In the oil industry, it is found that the crude oil as it comes from the well is often associated with water, the water and oil forming an emulsion. The type of emulsion formed varies, some of these emulsions being very stable and others being quite unstable.

By stable emulsions I refer to those mixtures of oil and water which will not resolve themselves into their original separate components by simple, low-temperature heating below the boiling point of water or which will not be resolved completely by being allowed to stand unagitated for an economical period of time, which might be a matter of a few hours or even a few days. Stable emulsions will not be resolved into their oil or water components even after weeks, months, and even years of standing. Aside from those constituents which are present in all permanent or stable emulsions and which act as emulsifying agents, and whose characteristics in themselves alone ultimately affect the stability or permanence of an emulsion, emulsions differ among themselves according to whether they are very finely dispersed or whether they constitute a very coarse dispersion; such emulsions in the crude oil producing industry are also termed "tight" or "loose", respectively.

A tight emulsion is one which is very finely dispersed, and generally is extremely stable, fulfilling the description of a stable emulsion given above, and when viewed in a centrifuge tube shows a uniformly close-grained tightly packed texture. Such emulsions generally offer the maximum resistance to being resolved into their component phases, and unless the difference in gravity between the oil and water is very great and the viscosity of this oil is exceedingly low, tight emulsions, probably largely because of their extremely fine dispersion, have little or no tendency to settle out and separate (when left unagitated over long periods of time) into a layer of "dry" oil or oil relatively free from emulsion, and a layer of the concentrated "sludge" or "bottom settlings" (B. S.) containing the greater portion, or all, of the emulsion. Should such settling and separation take place, however, because of the light gravity and low viscosity of the oil, the layer of "sludge" or "bottom settlings" still remains as a problem to be disposed of; it represents the concentrated, stable, emulsion residue which still contains an appreciable, economically important content of oil (say up to 80 or 90% by volume of sludge layer volume), and which still requires special treatment to resolve into its water and oil components. Such a layer when formed by mere settling out from an originally uniformly dispersed, stable, tight emulsion, still retains the characteristics, although in more concentrated form, of a very finely dispersed, tight emulsion, and in general cannot be resolved into its components by further protracted settling or even by the simple mechanical process later described in this application as my invention. As previously described above, this finely dispersed, stable, tight emulsion will require very special heat, chemical or electrical treatment, and even then such special treatment may not economically separate all of the emulsion into its water and oil components, but may leave a partially broken-down emulsion layer, which, however, if quite "loose", will lend itself to the simple mechanical treatment hereinafter described.

A loose emulsion when viewed in a centrifuge tube exhibits a flocculent coarse-grained, loosely packed structure, (sometimes described as "honeycomb") and when concentrated into a layer by settling, generally contains an appreciably lower oil content (say only up to 30 or 40%), and, of course, a correspondingly higher water content than is to be found in the previously described layer of fine-grained "sludge". If the oil is of sufficiently light specific gravity and low viscosity, this loose, flocculated emulsion, as contrasted with a tight emulsion, will show a more pronounced tendency to settle and concentrate into a sludge layer on the bottom of the container, or at the bottom of the oil layer above any water layer which may be present. When concentrated into such a layer, it may be withdrawn for further simple treatment according to the process hereinafter described and which is particularly adapted to the resolution of these so-called "loose", flocculated, partially broken-down sludges.

Due to the very loose structure there is some tendency for the oil and water components to be separated or resolved further if sufficient time is allowed, whereas these same water and oil components, if in a more intimate, finely dispersed condition, would show little or no tendency to separate in the manner described; some loose emulsions, of course, will show much more tendency to separate if allowed to stand than will other loose emulsions.

Thus, such a loosely emulsified, crude oil-water mixture, if left unagitated for considerable periods of time, will separate out still further (even if resulting from a previous primary settling or de-emulsifying process) into a still more concentrated layer of emulsion, gravitating to the lower portion of the container and allowing the drier oil to rise. Such a crude method of separating dry oil from emulsion was practiced in many fields in the past and in some fields is still being used particularly with lighter gravity oils, but, as a rule, this practice today is not economically feasible, due to the long time element involved and likewise because the loose emulsion which always remained still contains an appreciable amount of oil, and requires still further protracted settling time to bring about the slow separation of the oil from the water. As previously described, the portion which settles out consists almost entirely of a further slower separating concentration of an emulsion still of the loose type. Such loose emulsions, however, are amenable to the treatment provided for by my invention hereinafter described and which will quickly and economically bring about a resolution into the water and oil components.

It is an object of this invention to provide a novel method and apparatus for breaking such a loose emulsion.

One of the troublesome sources of such loose, flocculated emulsions is the layer of sludge that forms in an electrical dehydrator, due perhaps to overloading the capacity of such a unit, and which consequently results in an incomplete resolution into its components of the emulsion undergoing treatment. This sludge layer as a rule, accumulates in the lower portion of the dry oil layer and above the water layer in such a dehydrator. To such a layer of loose emulsion, my process is particularly adaptable.

A further object of the invention is to provide a system which can be used with or without electrical dehydrating means, and which greatly accelerates the separation of the treated emulsion into its constituents by specially treating that portion which is slowest to separate.

My method includes subjecting the loose emulsion to a gentle agitation, and in accomplishing this end I have found it most convenient and economical to achieve this agitation by a suitable pumping means. Thus, a gear pump has been found to be very effective. Other types of pumps may also be used, such as pumps of the centrifugal type, but it is very essential that these pumps be operated against low back pressures. If the pump operates against a relatively high pressure, it is impossible to secure any agglomeration. In fact, such a pump operating under conditions of high back pressure often has a decided emulsifying effect and changes the emulsion from a loose one to a tight one.

It is an object of this invention to provide a method of separating the constituents of a loose emulsion by passing this emulsion through a pumping means operating under such conditions of back pressure that a de-emulsifying effect is present.

It is a further object of the invention to provide a method of treating an emulsion by gently agitating it to effect agglomeration of one phase thereof.

One of the most advantageous uses of my invention is in conjunction with a settling tank which receives treated emulsion from a suitable treater such as an electrical dehydrator. The treated emulsion stratifies into three rather distinct layers, the uppermost a body of treated oil, the lowermost a body of water and other impurities, these bodies being separated by an intermediate body of loose emulsion which is in the process of separating.

It is a further object of this invention to withdraw a portion of this body of loose emulsion and subject it to an auxiliary treatment after which it is again allowed to settle.

Still a further object is to re-introduce this emulsion which has been subjected to an auxiliary action into the settling space, and preferably into the body of water therein.

Further objects and advantages of the invention will be evident hereinafter.

Referring to the drawing,—

Fig. 1 is a complete dehydrating system including my invention.

Fig. 2 illustrates a dehydrator in combination with a type of pumping means different from that shown in Fig. 1.

Referring particularly to Fig. 1, I have illustrated my invention in combination with an electrical dehydrator 6 comprising a tank 7. The upper end of this tank comprises a treating chamber 8, while the lower end thereof comprises a settling chamber 9. Supported in the treating chamber 8 by brackets 11 is a grounded electrode 12 which is smaller in diameter than the tank 7 so as to provide an annular space therebetween through which the treating chamber communicates with the settling chamber 9. Suspended from an insulator 16 mounted in the top of the tank 7 is a live electrode 17 which is also of conical shape and which cooperates with the grounded electrode 12 in providing a treating space 18.

An electric field is set up in the treating space 18 by a transformer 20, the secondary 21 of which is connected to the live electrode 17 through a conductor passing through the insulator 16, and is also connected to the grounded electrode 12 through the tank 7 and the brackets 11.

Emulsion to be treated is supplied to the treating space 18 through a pipe 24 which communicates directly with this space through a conduit 25. The pipe 24 connects to a delivery pipe 26, which in turn communicates with the upper end of a settling tank 27, the lower end of this tank being provided with a drain 28.

Treated emulsion is supplied to the settling tank through a pipe 29 communicating with the discharge end of a pumping means 30. This pumping means may be any means which gently agitates the emulsion supplied thereto through a pipe 33, and, as diagrammatically shown in Fig. 1, comprises a centrifugal pump 34 including a shell 35 which provides an impeller chamber in which an impeller 36 rotates. This impeller is mounted on a shaft 37 which is driven by a motor or other drive means 38, thus pumping the emulsion which has been previously heated in a heater 40 through the pipe 29 and into the settling tank 27, the back pressure on this pumping means 30 being controlled by a valve 41 in the pipe 29.

The emulsion which passes through the pipe 24 and into the electric field is therein treated so that the water phase thereof tends to agglomerate, the still unseparated mixture of oil and now-agglomerated water dropping into the settling chamber 9. Here the agglomerated water particles tend to settle, and eventually form a body of water 45. Similarly, the dry oil tends to rise in the settling space and forms a body of dry oil 46. However, there exists between the body of water and the body of dry oil another body of liquid 47 in the form of a loose emulsion which is in the process of settling. This loose emulsion is of such a character that a major portion thereof will eventually separate into water and oil, the former dropping and joining the body of water 45, and the latter eventually rising to the body of oil 46. This particular loose emulsion is very susceptible to treatment by a gentle agitation, and I have found it very desirable to position a perforated intake pipe 50 in this body of loose emulsion, this pipe communicating with the intake end of a pumping means 52, shown in Fig. 1 as comprising a gear pump 53 and having a shell 54 providing a chamber in which two intermeshed gears 55 and 56 rotate, these gears being driven by a suitable drive means, not shown, whereby they respectively rotate in directions indicated by the arrows 57. The loose emulsion is thus drawn through the perforated pipe 50 and discharged into a nipple 59 which is in communication with the delivery pipe 26 through a pipe 60 including a valve 61. The nipple 59 is also in communication with a return pipe 64 including a valve 65, this return pipe in turn communicating with a distributor 66 extending into the body of water in the tank in the settling chamber 9. Thus, by suitable manipulation of the valves 61 and 65, the loose emulsion may be recirculated either through the treating space or into the body of water 45. A valve 69 is provided in the delivery pipe 26 and assists in controlling the rate of flow through this delivery pipe.

Certain emulsions as they come from the well include portions of what I have termed a tight emulsion and also portions of a loose emulsion. The water phase of this loose emulsion may be agglomerated when the entire mass of emulsion is passed through the pumping means 30, provided that this pumping means does not operate against a high back pressure. In other words, the valve 41 is usually substantially wide open during pumping operations. The agglomerated water phase of the loose emulsion drops to the bottom of the settling tank 27 and is removed through the drain 28, while the tight emulsion rises in this settling tank and is drained from the upper end thereof by the delivery pipe 26. I prefer to utilize a settling tank 27 having an open top so that no pressure is built up therein which would increase the back pressure on the pumping means, or if a closed settling tank, is used to vent the top of it back to the incoming line to the heater, or to the suction pipe 33 to the pump, thus maintaining the minimum difference of pressure against the pumping means 30.

In Fig. 1, I have shown the treating space 18 as being a distance below the point at which this tight emulsion is removed from the settling tank 27 whereby a gravity flow will take place into this space. The valve 69 controls the rate of flow through the delivery pipe.

When this tight emulsion enters the treating space 18 it is subjected to a high intensity electric field and the water particles thereof are agglomerated in a well-known manner. Any dry oil which is separated in the treating space 18 may rise around the live electrode 17 and be withdrawn from the upper part of the tank through a pipe 70. However, a mixture of oil and agglomerated water drops downward into the settling chamber 9, and separation of these constituents takes place therein as previously described, the bodies of water, oil, and loose emulsion stratifying as indicated in Fig. 1.

The loose emulsion which is drawn through the pipe 50 when the pumping means 52 is set into operation is gently agitated when passing through this pumping means, and if conditions of back pressure are sufficiently low, agglomeration of the water particles will be effected. It is possible to separate the agglomerated water particles from the treated mixture issuing from the nipple 59 of the pumping means 52 in a number of different ways. It is, of course, possible to introduce this treated mixture into a settling tank and allow a gravity separation to take place. It is, however, often desirable to recirculate this treated mixture through the treating space 18, the dry oil therein serving to prevent short-circuiting in the treating space, and the mixture in other ways having a tendency to better the treating action taking place between the electrodes. In this event, the valve 65 is closed and the valve 61 opened, the treated mixture mixing with the tight emulsion at the junction of the pipes 24, 26, and 60. The relative amounts of treated mixture and tight emulsion may be regulated by the valves 61 and 69 and also by the speed of the motor driving the pumping means 52.

In other instances it is desirable to conduct the treated mixture from the nipple 59 into the body of water 45. In this event, the valve 61 is closed and the valve 65 opened. This method of treatment is very desirable with certain oils, for I have found that the introduction of the treated mixture into this body of water is conducive to a better and faster separation. This is probably due to the action which takes place when the treated mixture is projected from the distributor 66, the water in this mixture readily associating itself with the surrounding body of water, and the dry oil or tightly emulsified oil rising therein.

It should be clear that various types of pumping means may be utilized without departing from the spirit of this invention. Thus, while I have shown the pumping means 52 as comprising a gear pump, it is entirely possible to use a centrifugal pump in this connection. Such a combination is illustrated in Fig. 2 which shows the pipe 50 connected to the intake of a centrifugal pump 80 providing a shell 81 in which an impeller 82 is adapted to rotate to discharge fluid into the discharge pipe 83 connected to the distributor 66, and including a valve 84 for controlling the back pressure against which the centrifugal pump operates. A motor 85 or other means is used for driving the impeller, and the rate of circulation is dependent upon the speed of rotation of the impeller. The valve 84 may be partially closed to limit the flow, providing no excessive back pressure is built up on the centrifugal pump 80. If this valve 84 is closed beyond a certain point, the back pressure built up on the turbine pump actually causes a re-emulsification of the oil and water present in the loose emulsion withdrawn through the pipe 50. It is impossible to specify a limiting value on this back pressure which would be applicable to all emulsions and all types of pumps. On some pumps it is possible to utilize higher back pressures than on others. With a turbine pump, for instance, the back pressure must be very low, while on the gear pump, the type illustrated in Fig. 1, it is possible to somewhat increase this back pressure without causing re-emulsification.

The rate of treatment in the treater 6 is dependent upon the possible rate of settling in the settling chamber 9, for the inflow of tight emulsion must not be greater than the settling action which can take place. It thus becomes desirable to increase this settling action in any way possible, and the system herein disclosed wherein the loose emulsion stratifies between the bodies of oil and water has been found to be very effective in accelerating this settling action. It should be clear that the body of loose emulsion 47 is just in the process of settling and separating, and the major portion thereof will ordinarily settle out of itself and resolve itself into its components if given sufficient time. If, however, the loose emulsion is circulated through water by some pumping means, this rate of separation or resolution may increase many fold.

Inasmuch as the slow resolution of the loose emulsion is one of the, if not the main, factors in retarding repeated separation, my process of subjecting this loose emulsion to auxiliary treatment is of primary importance in increasing the permissible rate at which it is being formed within the electric treater and the permissible amount which at any time is being subjected to settling and subsequent resolution and thus increasing the capacity of the electric treater 6.

I claim as my invention:

1. A method of separating the phases of a loose emulsion, which includes the steps of: agglomerating one phase of said emulsion by subjecting said emulsion to a pumping action with no substantial back pressure; thereafter and immediately separating the agglomerated phase from the other phase by difference in specific gravity.

2. A method of separating the phases of a loose emulsion by means of a pumping means, which includes the step of operating said pumping means to circulate said loose emulsion therethrough, regulating the back pressure against which said pumping means operates to a value below that minimum value at which emulsification takes place and subsequently directly introducing into a settling zone the constituents of said loose emulsion discharged from said pumping means.

3. A method of treating a loose flocculent emulsion which stratifies between a layer of dry oil and water when a treated petroleum emulsion is allowed to settle, which method includes the steps of: withdrawing said loose flocculent emulsion from between said water and oil; mechanically treating said loose flocculent emulsion; and introducing the treated flocculent emulsion into said layer of water and without further agglomerating treatment.

4. In combination: a tank providing a settling space enclosing stratified bodies of loose emulsion and water; a pumping means; means communicating between the intake of said pumping means and said body of loose emulsion; and means communicating directly between the discharge of said pumping means and said body of water.

5. In combination: a tank providing a settling space; a pumping means capable of breaking a loose emulsion when working against but a small back pressure, said pumping means discharging directly into said settling space; and means for delivering a loose emulsion to the intake of said pumping means.

6. In combination: a pair of electrodes defining a treating space; means for introducing an emulsion to be treated into said treating space wherein one of the phases thereof is agglomerated; walls defining a settling space into which the treated emulsion passes, the heavier constitutent of said emulsion settling in said space and the lighter constituent of said emulsion rising in said space; and pumping means in the form of a gear pump for withdrawing a portion of the yet unseparated mixture from between the bodies of said lighter and heavier constituents, said pumping means operating against insufficient back pressure to effect a re-emulsification of said constituents passing therethrough.

7. In combination: a pair of electrodes defining a treating space; means for introducing an emulsion to be treated into said treating space wherein one of the phases thereof is agglomerated; walls defining a settling space into which the treated emulsion passes, the heavier constituent of said emulsion settling in said space and the lighter constituent of said emulsion rising in said space; pumping means for withdrawing a portion of the yet unseparated mixture from between the bodies of said lighter and heavier constituents; a low-back-pressure discharge means into which said pumping means discharges, said discharge means being open to such extent as to prevent building up of a back pressure sufficient to reemulsify said constituents passing therethrough; and means for conducting said constituents from said discharge means back into said settling space.

HARMON F. FISHER.